United States Patent
Tojo et al.

(10) Patent No.: US 9,731,448 B2
(45) Date of Patent: Aug. 15, 2017

(54) VENT ASSEMBLY DEVICE FOR TWIN-SCREW EXTRUDER

(71) Applicant: THE JAPAN STEEL WORKS, LTD., Tokyo (JP)

(72) Inventors: Makoto Tojo, Hiroshima (JP); Yoshihiko Iwamoto, Hiroshima (JP); Jun Kakizaki, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 174 days.

(21) Appl. No.: 14/651,446

(22) PCT Filed: Feb. 13, 2014

(86) PCT No.: PCT/JP2014/053256
§ 371 (c)(1),
(2) Date: Jun. 11, 2015

(87) PCT Pub. No.: WO2014/129367
PCT Pub. Date: Aug. 28, 2014

(65) Prior Publication Data
US 2015/0314512 A1  Nov. 5, 2015

(30) Foreign Application Priority Data
Feb. 21, 2013 (JP) ................................ 2013-031974

(51) Int. Cl.
*B29C 47/40* (2006.01)
*B29C 47/76* (2006.01)
*B29C 47/08* (2006.01)

(52) U.S. Cl.
CPC ........ *B29C 47/763* (2013.01); *B29C 47/0835* (2013.01); *B29C 47/40* (2013.01); *B29C 47/402* (2013.01); *B29C 47/767* (2013.01)

(58) Field of Classification Search
CPC .... B29C 47/402; B29C 47/763; B29C 47/767
(Continued)

(56) References Cited

U.S. PATENT DOCUMENTS 2,078,565 A * 4/1937 Durst et al. .......... A23G 3/0226
100/90
3,917,507 A * 11/1975 Skidmore ............. B29C 47/362
159/2.2
5,297,864 A    3/1994 Knoll et al.

FOREIGN PATENT DOCUMENTS

DE    42 28 468      3/1994
EP    2 218 568      8/2010
(Continued)

OTHER PUBLICATIONS

International Search Report issued May 13, 2014 in International (PCT) Application No. PCT/JP2014/053256.
(Continued)

*Primary Examiner* — David Sorkin
(74) *Attorney, Agent, or Firm* — Wenderoth, Lind & Ponack, L.L.P.

(57) ABSTRACT

A vent assembly device for a twin-screw extruder includes a vent assembly (7) that has a vent opening (6) and that is provided in a cylinder (1) of a twin-screw extruder (11) having a left axis-side screw (2) and a right axis-side screw (3). The size of at least the vent opening (6) of the vent assembly (7) can be freely modified by forming the vent assembly (7) from a plurality of vent assembly units (7a) and by providing the plurality of vent assembly units (7a) for one vent opening (6).

12 Claims, 8 Drawing Sheets

(58) Field of Classification Search
USPC .............................................. 366/75, 84, 85
See application file for complete search history.

(56) References Cited

FOREIGN PATENT DOCUMENTS

| | | |
|---|---|---|
| JP | 4-161238 | 6/1992 |
| JP | 6-155551 | 6/1994 |
| JP | 2001-138381 | 5/2001 |
| JP | 2002-210805 | 7/2002 |
| JP | 2004-25669 | 1/2004 |
| JP | 2010-253804 | 11/2010 |

OTHER PUBLICATIONS

Extended European Search Report issued Jul. 28, 2016 in European Application No. 14754908.3.

* cited by examiner

VENT ASSEMBLY DEVICE FOR TWIN-SCREW EXTRUDER

BACKGROUND OF THE INVENTION

1. Technical Field

The present invention relates to a vent assembly device for a twin-screw extruder, and more particularly to a novel improvement for making it possible to freely modify the size of a vent opening in a vent assembly, by forming the vent assembly device from a plurality of small pieces of vent assembly units.

2. Description of the Related Art

Figure 13:
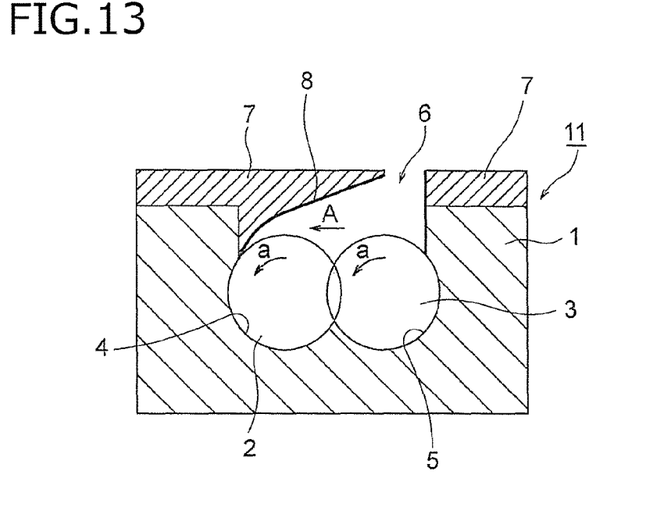
FIG. 13 is a cross-sectional diagram illustrating a vent assembly device of a conventional twin-screw extruder.

Conventional examples of various vent assembly devices for twin-screw extruders include, for instance, the configuration disclosed in Japanese Patent Application Publication No. 2004-25669, illustrated in FIG. 13.

In FIG. 13, the reference symbol 7 denotes a vent assembly that is provided on a cylinder 1 of a twin-screw extruder 11. The whole vent assembly 7 is formed integrally so as to have a deaeration port 6.

A first screw 2 and a second screw 3 are rotatably provided, meshing with each other, in respective screw receiving holes 4, 5 within the cylinder 1. An undercut 8 of the vent assembly 7 is configured so as to cover part of the first and second screws 2, 3.

SUMMARY OF THE INVENTION

Due to the above configuration, conventional vent assembly devices for twin-screw extruders exhibited the following problems.

Figure 14:
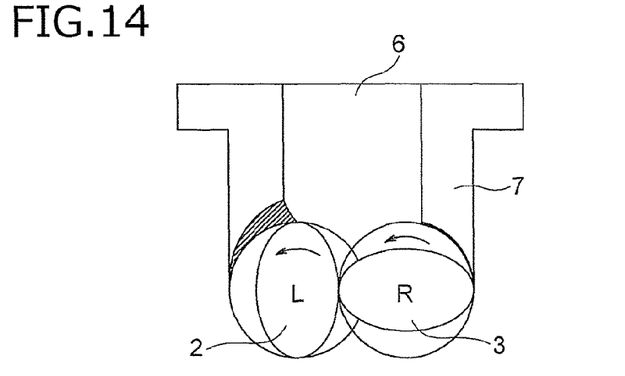
FIG. 14 is a cross-sectional diagram illustrating a conventionally used vent assembly.
Figure 15:
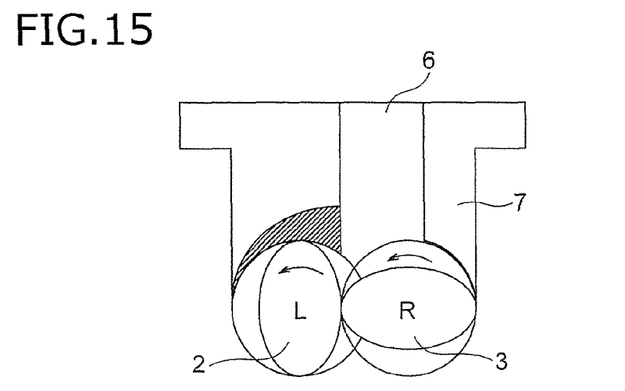
FIG. 15 is a cross-sectional diagram illustrating another form of FIG. 12.
Figure 16:
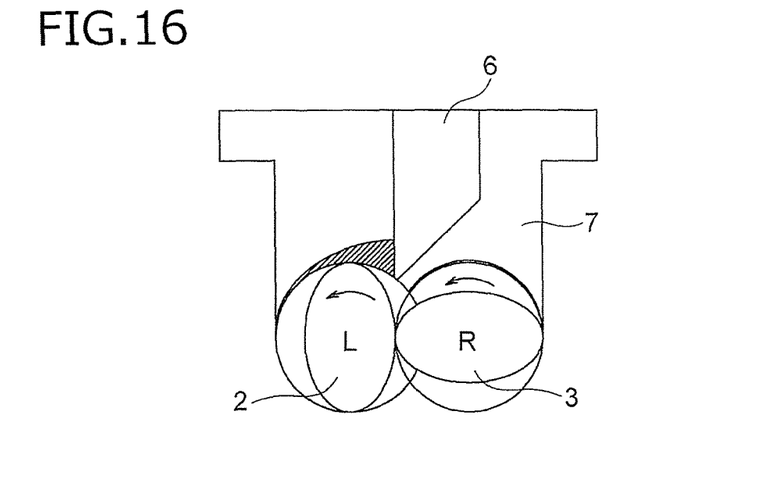
FIG. 16 is a cross-sectional diagram illustrating another form of FIG. 12.

Specifically, the vent assembly structure of the twin-screw extruder must selectively utilize various types of vent assembly, such as those illustrated in FIG. 14 to FIG. 16, depending on the viscosity, flowability and degree of adhesion of a starting material, and the volatile content generated by the starting material. In a case, for instance, of substantial volatile matter content in the starting material, or substantial content of volatile matter used as a devolatilizing agent, reducing the flow rate of gas at vent ports allows preventing vent rise and scattering of resin fragments (entrainment). Accordingly, an A-type having a large vent port opening of FIG. 14 is suitable herein, with high resin viscosity and no wrapping around the screws, while a C-type of FIG. 16, having a restraint on the left axis-side is suitably used for a starting material that exhibits resin jumping as a result of the rotation of the screws.

In the vent assembly device in FIG. 14, by contrast, a vent assembly was proposed that could cope with a given specific starting material; to produce small runs of numerous article types. However, it was necessary to fabricate an optimal vent assembly device, and check the operation of the latter, depending on the viscosity, flowability, degree of adhesion and generated volatile content of the starting material whenever the starting material was changed. When using a starting material that required fine adjustments for vent rise, it was necessary to fabricate a large number of vent assemblies, and to assess an optimal vent assembly for each given starting material, all of which entailed considerable expense. In the production of small runs of numerous article types as well, it was necessary to possess vent assemblies optimized for each starting material, and significant equipment costs were accordingly incurred. Preparing numerous types of vent assembly translated into necessary space for storage and storage costs, and was thus undesirable in terms of management of the twin-screw extruder.

In order to solver such problems, the present invention resorts in particular, to a configuration wherein the size of at least a vent opening of a vent assembly can be modified freely by forming the vent assembly from a plurality of vent assembly units that are formed by dividing up the vent assembly into small pieces.

The vent assembly device for a twin-screw extruder according to the present invention is a vent assembly device for a twin-screw extruder, including a vent assembly that has a vent opening and that is provided in a cylinder of a twin-screw extruder having a left axis-side screw and a right axis-side screw. The size of at least the vent opening of the vent assembly can be modified freely by forming the vent assembly from a plurality of vent assembly units. Further, the vent assembly units corresponding to the left axis-side screw are formed of a plurality of units, the vent assembly units corresponding to the right axis-side screw are formed of a plurality of units, and the vent assembly units have a linear shape and an L-shape as viewed in a cross-section. Further, the vent assembly units corresponding to the left axis-side screw are formed of one or a plurality of units, the vent assembly units corresponding to the right axis-side screw are formed of one or a plurality of units, and the vent assembly units have a linear shape and an L-shape as viewed in a transverse cross-section. Each vent assembly unit is clamped by a clamping screw configured such that a longitudinal direction thereof is disposed so as to be parallel to a horizontal line that joins a left axial center of the left axis-side screw and a right axial center of the right axis-side screw. From among the vent assembly units, the vent assembly units that are positioned on both outermost sides, as viewed from a cross-section of the vent assembly, have an L-shape as viewed in a cross-section. The vent assembly units all have an L-shaped cross-section, such that a top piece that is formed at the top of each of the vent assembly units extends in a horizontal direction, and a fixing screw is screwed in each top piece along a vertical direction.

By virtue of the above features, the vent assembly device for a twin-screw extruder according to the present invention affords the following effects.

In a vent assembly device for a twin-screw extruder, including a vent assembly that has a vent opening and that is provided in a cylinder of a twin-screw extruder having a left axis-side screw and a right axis-side screw, the size of at least the vent opening of the vent assembly can be modified freely by forming the vent assembly from a plurality of vent assembly units. In consequence, vent shape can be easily modified on the basis of combinations of vent assembly units, even if the characteristics of the starting material varies, while no new vent assembly need be fabricated afresh. Costs can be accordingly reduced.

Further, times can be shortened since the vent shape can be easily modified on the basis of combinations of vent assembly units, even if the characteristics of the starting material varies, while no new vent assembly need be fabricated afresh.

Maintenance costs can be reduced in that it becomes possible to replace just those problematic vent assembly units in case of the occurrence of partial corrosion, derived from a corrosive component contained in the starting material, or partial wear of edges or the like.

Therefore, the occurrence of problems such as vent rise, vent wall adhesion, scattering of resin fragments (entrainment) and the like, derived from differences in, for instance, the viscosity, flowability, degree of adhesion and generated volatile content of a starting material, can be forestalled by using the vent assembly of the present invention.

Further, the vent assembly units corresponding to the left axis-side screw are formed of a plurality of units, the vent assembly units corresponding to the right axis-side screw are formed of a plurality of units, and the vent assembly units have a linear shape and an L-shape as viewed in a cross-section. As a result, the configuration of the vent assembly units is simplified, and handling and management are made easier.

In the case of an extruder of co-rotating twin screws where a special vent shape is necessary for coping with a specific starting material, the special vent shape corresponds roughly to an undercut on either one of the left axis-side screw or right axis-side screw (side of upward rotation at a meshing section). Accordingly, it suffices to prepare beforehand, or fabricate anew, a plurality of sets of vent assembly units for this screw alone.

Further, the vent assembly units corresponding to the left axis-side screw are formed of one or a plurality of units. The vent assembly units corresponding to the right axis-side screw are formed of one or a plurality of units, and the vent assembly units have a linear shape and an L-shape as viewed in a transverse cross-section. Vent assemblies can be fabricated easily as a result.

Each vent assembly unit is clamped by a clamping screw configured such that a longitudinal direction thereof is disposed to be parallel to a horizontal line that joins a left axial center of the left axis-side screw and a right axial center of the right axis-side screw. The vent assembly can be assembled easily as a result.

From among the vent assembly units, the vent assembly units that are positioned on both outermost sides, as viewed from a cross-section of the vent assembly, have an L-shape as viewed in a cross-section. As a result, the vent assembly units are fabricated very easily.

The vent assembly units all have an L-shaped cross-section, such that a top piece that is formed at the top of each of the vent assembly units extends in a horizontal direction, and a fixing screw is screwed in each top piece along a vertical direction. As a result, it becomes possible to attach/detach just the vent assembly units, the number of which is to be increased/reduced, and to modify vent shape efficiently, while those vent assembly units that do not pertain to an intended shape modification are kept attached to the twin-screw extruder.

DETAILED DESCRIPTION OF THE INVENTION

It is an object of the present invention to provide a vent assembly device for a twin-screw extruder such that the size of a vent opening of a vent assembly can be freely modified by forming a vent assembly from a plurality of vent assembly units.

WORKING EXAMPLES

Preferred embodiments of the vent assembly device for a twin-screw extruder according to the present invention will be explained next with reference to the accompanying drawings.

Portions identical or similar to those of the conventional example will be explained using identical reference symbols.

Figure 1:
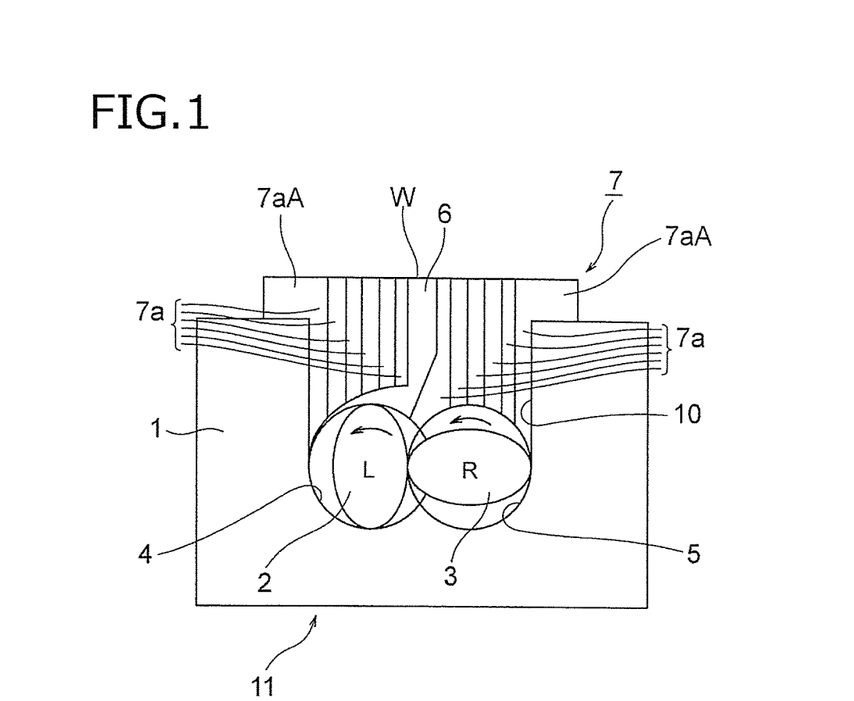
FIG. 1 is a cross-sectional diagram illustrating a vent assembly device for a twin-screw extruder according to the present invention.

In FIG. 1, the reference symbol 1 denotes a cylinder the overall shape thereof is that of a long tube, such that a pair of screw receiving holes 4, 5 is formed within the cylinder 1. In the screw receiving holes 4, 5 there are respectively provided a left axis-side screw 2 and a right axis-side screw 3, so as to be rotatable along a same direction denoted by the arrows, in a state where the left axis-side screw 2 and the right axis-side screw 3 mesh with each other.

A vent assembly 7 having a vent opening 6 is provided inside the vent receiving hole 10 that is formed within the cylinder 1. The vent assembly 7 is configured by a plurality of vent assembly units 7a.

The vent assembly 7, which is illustrated as a longitudinal section, is configured by two types of vent assembly, including a vent assembly made up of a plurality of linear shapes, viewed in a longitudinal section, and a plurality of L-shapes having respective top pieces 7aA that extend in a horizontal direction and that that have a flange shape.

In the case of FIG. 1, the vent assembly units 7a are depicted in a state in which there is formed a vent opening 6 in the smallest state (small transversal width W) as viewed in a cross-section. However, the forms depicted in FIG. 2 to FIG. 6 below are instances where, in the configuration of FIG. 1, the vent assembly units 7a are integrated using respective clamping screws 12 and the number of the vent assembly units 7a, corresponding to the screws 2, 3, is modified, to freely modify thereby the size (transversal width W as viewed in a cross-section) of the vent opening 6.

Figure 2:
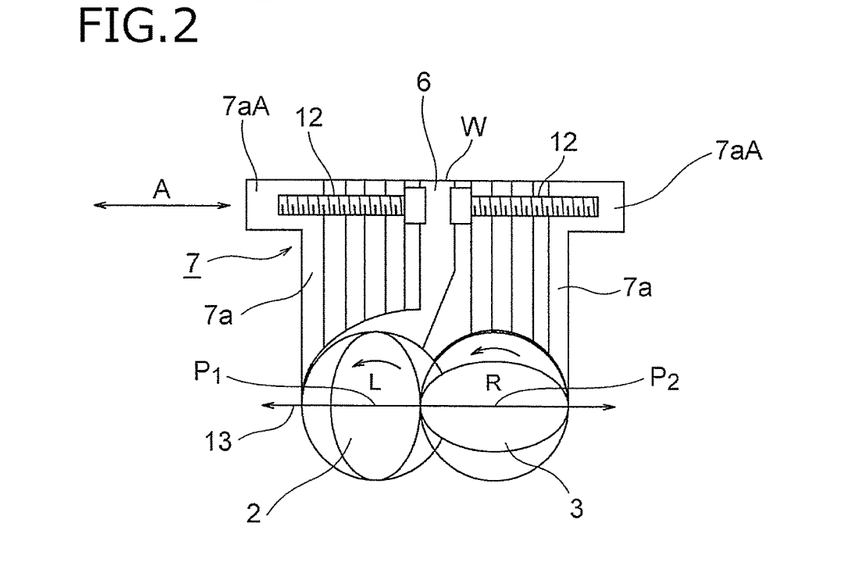
FIG. 2 is a cross-sectional diagram illustrating a clamped state of FIG. 1.

In the form of FIG. 2 there are six vent assembly units 7a corresponding to the left axis-side screw 2, and six vent assembly units 7a corresponding to the right axis-side screw 3, in a configuration with identical number of units, with a large left axis-side restraint, a large right axis-side restraint, and a small vent opening 6, i.e. an assembly in a state where the transversal width W is small, as viewed in a cross-section.

Each vent assembly unit 7a is clamped in a state where there is screwed a clamping screw 12 configured such that the longitudinal direction A thereof is disposed so as to be parallel to a horizontal line 13 that joins a left axial center $P_1$ and a right axial center $P_2$ of the respective screws 2, 3.

Figure 3:
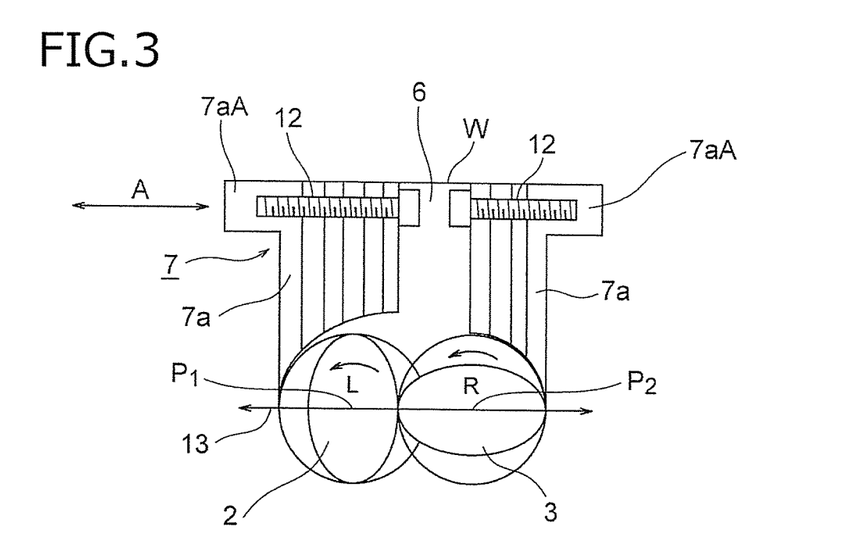
FIG. 3 is a cross-sectional diagram illustrating another form of FIG. 2.

In the configuration of FIG. 3, the size (transversal width W) of the vent opening 6 is increased, with respect to the configuration of FIG. 2, through a reduction in the number of the vent assembly units 7a corresponding to the right axis-side screw 3, such that the left axis-side restraint is now large, the right axis-side restraint is medium, and the size (transversal width W) of the vent opening 6 is medium.

Figure 4:
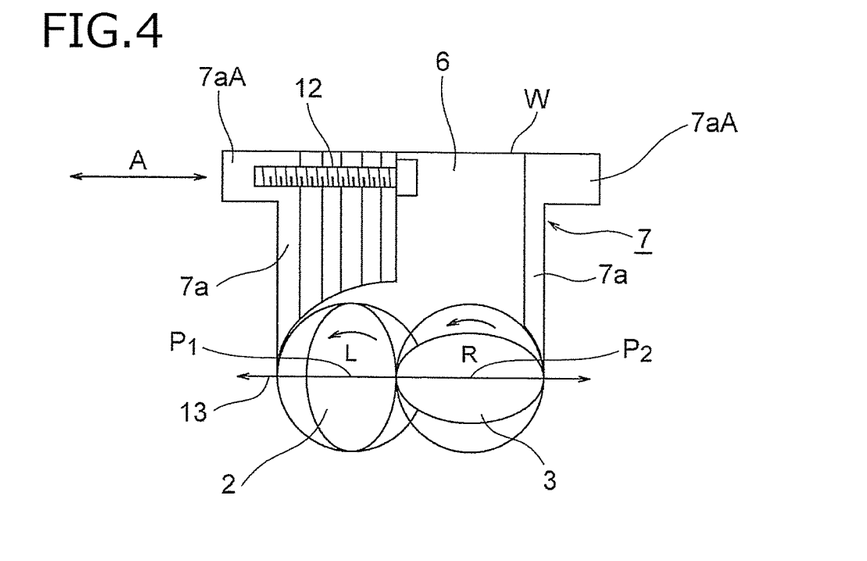
FIG. 4 is a cross-sectional diagram illustrating another form of FIG. 2.

In FIG. 4, the number of the vent assembly units 7a corresponding to the right axis-side screw 3 in FIG. 3 is reduced to only one L-shaped vent assembly unit; a state is thus brought about in which the left axis-side restraint is large, the right axis-side restraint is small, and the vent opening 6 is wide.

Figure 5:
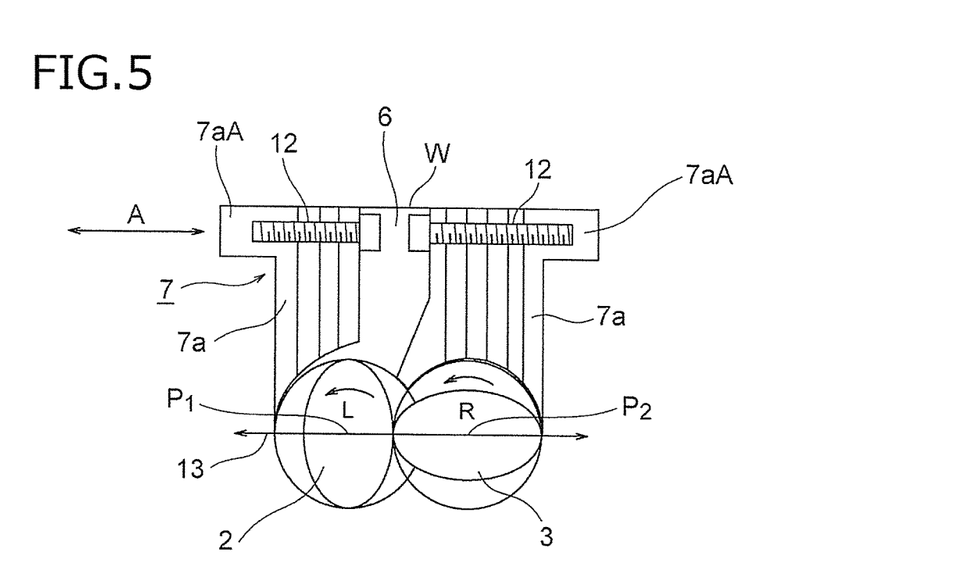
FIG. 5 is a cross-sectional diagram illustrating another form of FIG. 1.

In the configuration of FIG. 5, the number of the vent assembly units 7a corresponding to the right axis-side screw 3 is identical to that of FIG. 2, while the number of the vent assembly units 7a corresponding to the left axis-side screw 2 is reduced with respect to that of FIG. 2, such that the transversal width W is greater than that of the vent opening 6 of FIG. 1, the left axis-side restraint is medium, the right axis-side restraint is large and the size of the vent opening 6 is medium.

Figure 6:
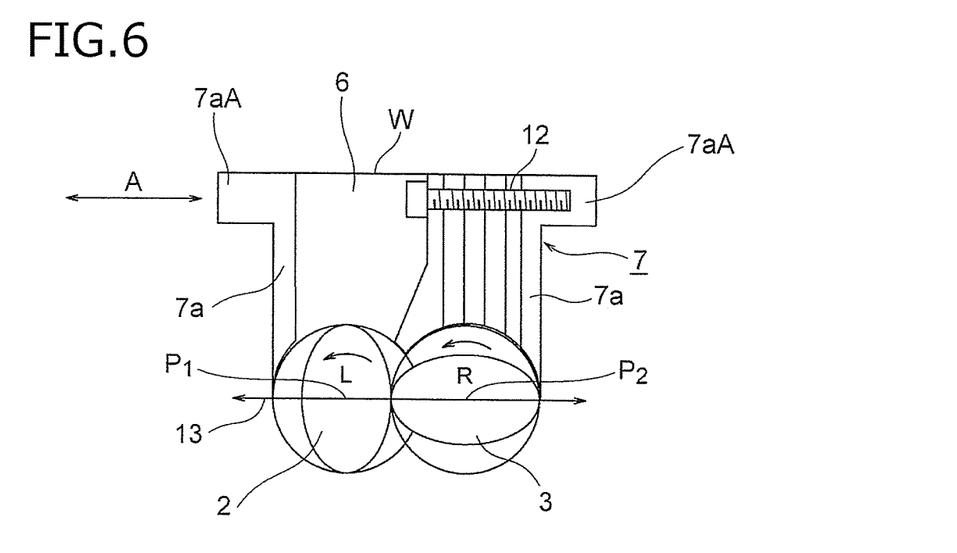
FIG. 6 is a cross-sectional diagram illustrating another form of FIG. 1.

The configuration in FIG. 6 is the exact opposite of the configuration of FIG. 4 described above, with one vent assembly unit 7a corresponding to the left axis-side screw 2 and the number of the vent assembly units 7a corresponding to the right axis-side screw 3 set to be identical to that of the configuration of FIG. 2; as a result, the left axis-side restraint is small, the right axis-side restraint is large, the size of the vent opening 6 is large, and the left-right position of the vent opening 6 in FIG. 4 is the reverse of that of FIG. 6.

Therefore, as illustrated in the examples of FIG. 2 through FIG. 6 described above, the size and position of the vent opening 6 with respect to the screws 2, 3 can be modified freely when the size and the position of the vent opening 6 are modified in a case where the characteristic of the starting material changes, and when only a vent assembly unit 7a at a problematic location is replaced, in case of the occurrence of partial corrosion, derived from a corrosive component contained in the starting material, or partial wear of edges or the like, and it becomes possible to dispense with the hassle of fabricating beforehand the vent assembly 7 every time, of fabricating beforehand multiple types of the vent assembly 7, as in conventional instances. In the vent assembly 7 in FIG. 1 to FIG. 6 described above, the vent assembly units 7a that are positioned on both outermost sides, as viewed in a cross-section, have an L-shape.

Figure 7:
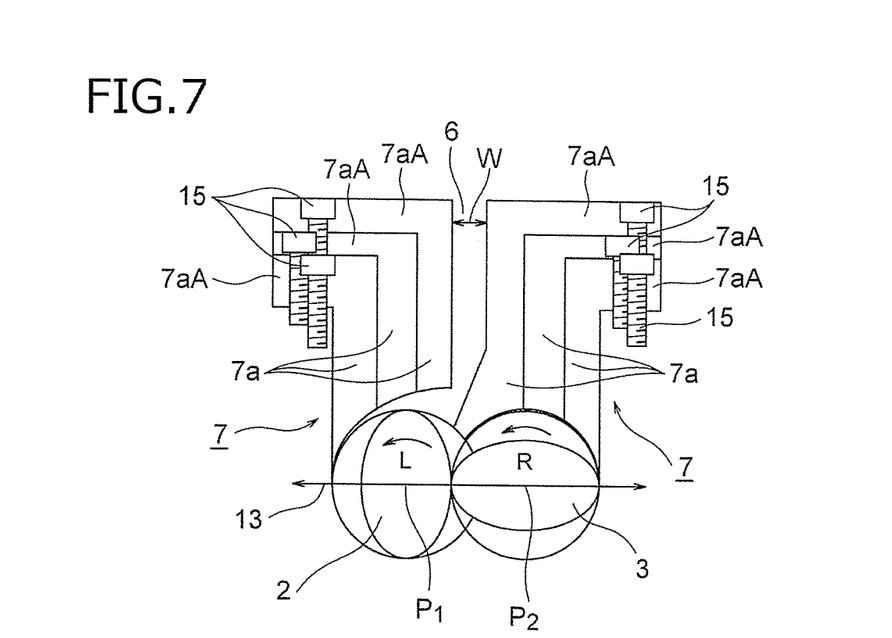
FIG. 7 is a cross-sectional diagram illustrating another form of FIG. 1.
Figure 9:
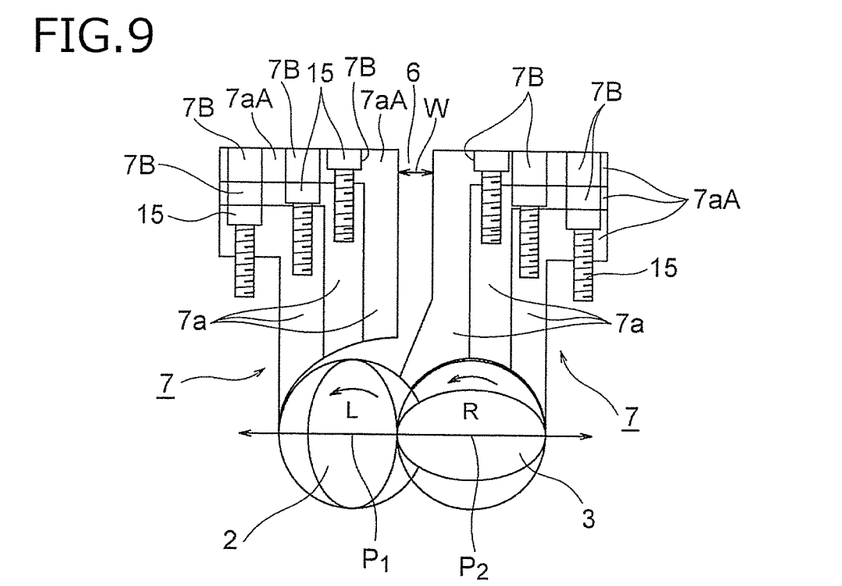
FIG. 9 is a cross-sectional diagram illustrating another form of FIG. 7.

FIG. 7 and FIG. 9 illustrate another form, different from those illustrated in FIG. 1 through FIG. 6 above. The vent assembly units 7a all have an L-shaped cross-section, such that at the top of the vent assembly units 7a there are formed respective top pieces 7aA that extend in the horizontal direction. The top pieces 7aA are fixed to each other, or to the cylinder 1, by respective fixing screws 15 that are screwed in a direction perpendicular to the horizontal line 13, i.e. in the vertical direction, via through-holes 7B that have an inner diameter larger than the outer diameter of the fixing screws 15.

Figure 8:
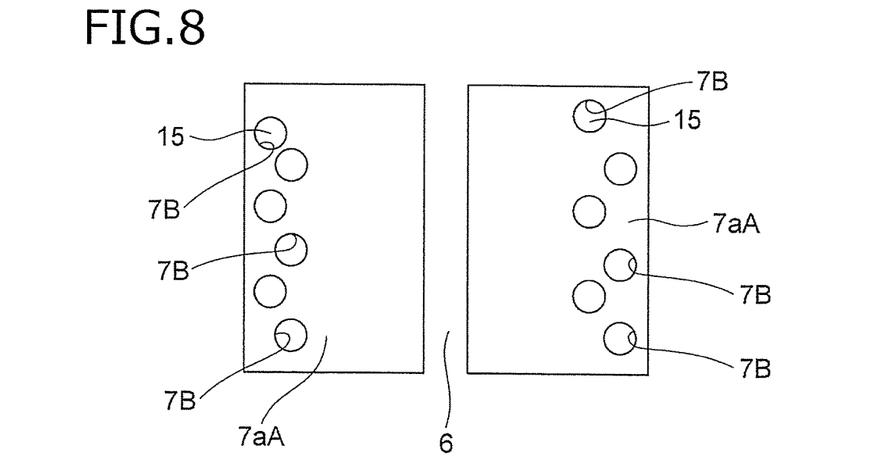
FIG. 8 is a plan-view diagram of FIG. 7.
Figure 10:
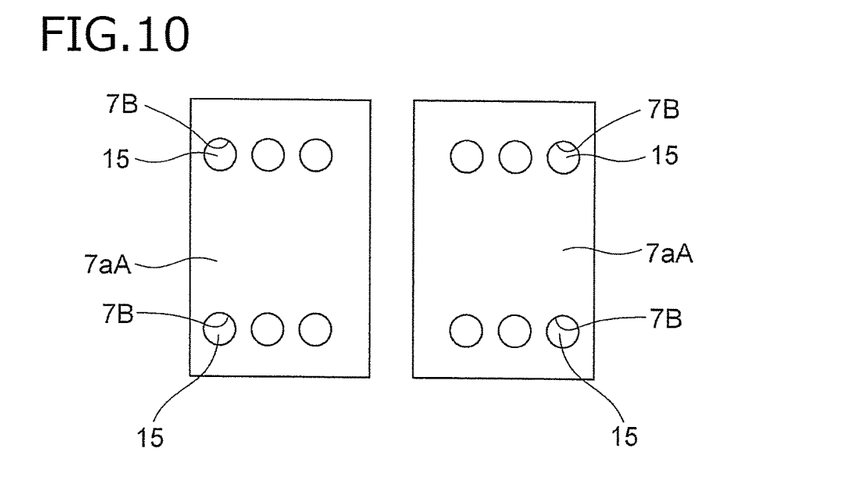
FIG. 10 is a plan-view diagram of FIG. 9.

When the mutual arrangement of the fixing screws 15 is viewed from above the vent assembly 7, the top pieces 7aA may be staggered with respect to each other, as illustrated in FIG. 8, or may be disposed along a straight line, as illustrated in FIG. 10.

Each fixing screw 15 is configured as illustrated in FIG. 9 with through-holes 7B having an inner diameter larger than the outer diameter of the fixing screws 15 being formed in the respective top pieces 7aA, such that the fixing screws 15 of the top pieces 7aA that are positioned below the uppermost top piece 7aA can be screwed-fastened and removed, at a time where respective top pieces 7aA overlap the top of the fixing screws 15.

In the case of the form illustrated in FIG. 7 and FIG. 9, it becomes therefore possible to insert and remove only those vent assembly units of interest, without removal of the entire vent assembly, when increasing and reducing the number of vent assembly units 7a as needed. Accordingly, the size of the vent opening 6 and the position thereof corresponding to the screws 2, 3 can be modified freely and quickly from the configuration in FIG. 2 above to that of FIG. 6.

Figure 11:
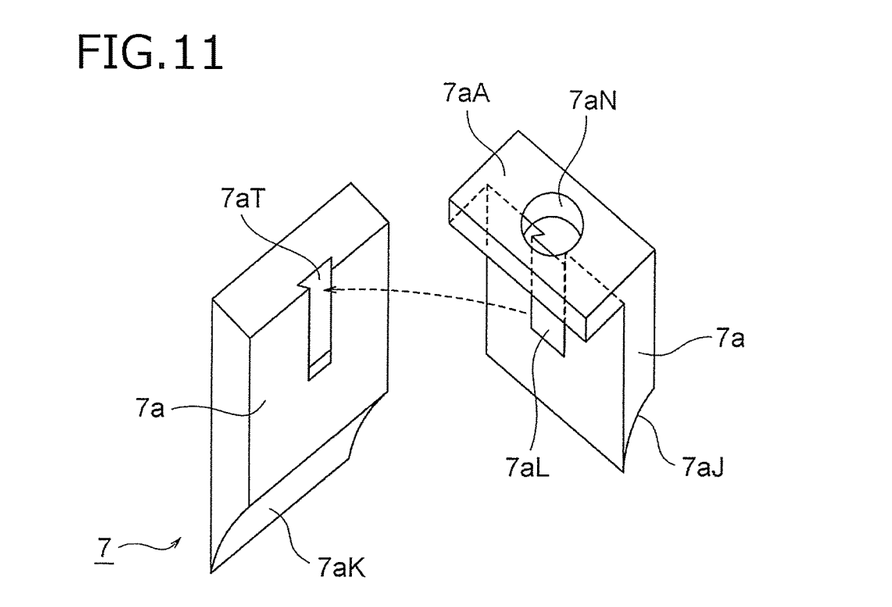
FIG. 11 is an exploded perspective-view diagram illustrating another form of FIG. 1.
Figure 12:
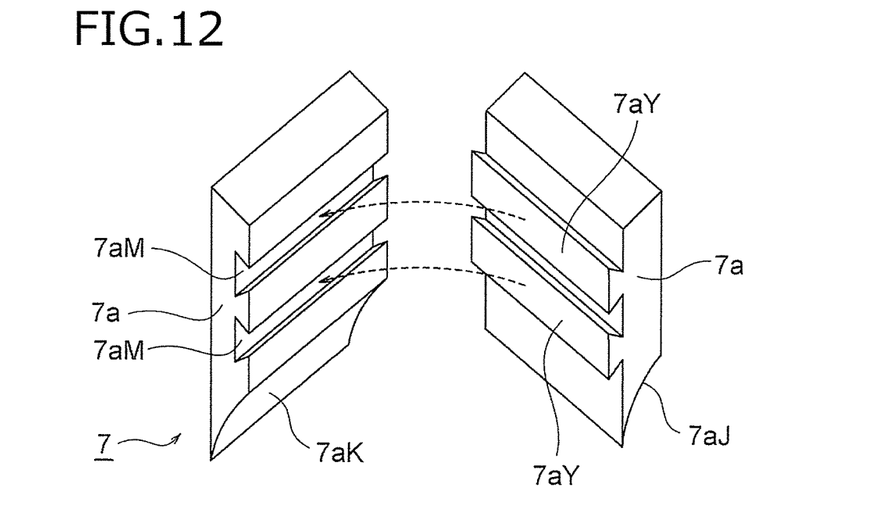
FIG. 12 is an exploded perspective-view diagram illustrating another form of FIG. 11.

FIG. 11 and FIG. 12 illustrate another instance of the form illustrated in FIG. 1 through FIG. 6 above. In FIG. 11, a longitudinal groove 7aT and a longitudinal ridge 7aL are formed, along the vertical direction, in order to connect a respective L-shaped vent assembly unit 7a with a respective vent assembly unit 7a of linear shape.

Each vent assembly unit 7a becomes integral with a respective longitudinal groove 7aT through fitting of the longitudinal ridge 7aL, whereupon a first and a second arc-shaped section 7aJ, 7aK become connected in a contiguous state.

The above configuration further includes a circular eyehole 7aN formed in the top piece 7aA of each L-shaped vent assembly unit 7a, so that the fitting state of the longitudinal ridge 7aL with the longitudinal groove 7aT can be checked via the eyehole 7aN.

FIG. 12 illustrates another form of FIG. 11. In this form, all the vent assembly units 7a have a linear shape, and a plurality of transversal ridges 7aY is provided in one vent assembly unit 7a while transversal grooves 7aM into which the transversal ridges 7aY fit are formed in the other vent assembly unit 7a. A shape in which the first and the second arc-shaped sections 7aJ and 7aK are contiguous is thus achieved by combining the vent assembly units 7a.

FIG. 11 and FIG. 12 illustrate a pair of vent assembly units 7a, but other combinations of one or more pairs can also be resorted to, as needed.

Through formation of a vent assembly in the form of a plurality of vent assembly units, the vent assembly device for a twin-screw extruder according to the present invention allows the size of a vent opening of a vent assembly to be freely modified. This makes the vent assembly device for a twin-screw extruder suitable for, for instance, testing of novel extrusion processes.

EXPLANATION OF REFERENCE NUMERALS 1 cylinder
2 left axis-side screw
3 right axis-side screw
4, 5 screw receiving hole
6 vent opening
7 vent assembly
7a vent assembly units
7B through-hole
7aA top piece 10 vent receiving hole
11 twin-screw extruder
12 clamping screw
13 horizontal line
15 fixing screw
$P_1$ left axial center
$P_2$ right axial center
A longitudinal direction
7aJ first arc-shaped section
7aK second arc-shaped section
7aL longitudinal ridge
7aT longitudinal groove
7aY transversal ridges
7aM transversal groove

The invention claimed is:

1. A vent assembly device for a twin-screw extruder, comprising:
a twin-screw extruder housing defining first and second screw receiving holes for receiving a left axis-side screw and a right axis-side screw, respectively;
a vent assembly disposed in a vent receiving hole of the twin-screw extruder housing, the vent assembly forming a single vent opening,
the vent assembly comprising a plurality of vent assembly units, wherein the size of at least the vent opening of the vent assembly can be modified by removing one or more of the plurality of vent assembly units for the single vent opening.

2. The vent assembly device for a twin-screw extruder according to claim 1, wherein the vent assembly units corresponding to the first screw receiving hole are formed of a plurality of the units, the vent assembly units corresponding to the second screw receiving hole are formed of a plurality of the units, and the vent assembly units have one of a linear shape and an L-shape as viewed in a cross-section.

3. The vent assembly device for a twin-screw extruder according to claim 1, wherein the vent assembly units corresponding to the left axis-side screw are formed of one or a plurality of the units, the vent assembly units corresponding to the right axis-side screw are formed of one or a plurality of the units, and the vent assembly units have one of a linear shape and an L-shape as viewed in a cross-section.

4. The vent assembly device for a twin-screw extruder according to claim 1, further comprising a left side clamping screw and a right side clamping screw,
wherein each of the vent assembly units corresponding to the first screw receiving hole is clamped by a clamping screw configured such that a longitudinal direction of the left side clamping screw is parallel to a horizontal line that joins an axial center of the first screw receiving hole and an axial center of the second screw receiving hole.

5. The vent assembly device for a twin-screw extruder according to claim 2, wherein each of the vent assembly units is clamped by a clamping screw configured such that a longitudinal direction thereof is disposed so as to be parallel to a horizontal line that joins an axial center of the first screw receiving hole and an axial center of the second screw receiving hole.

6. The vent assembly device for a twin-screw extruder according to claim 3, wherein each of the vent assembly units is clamped by a clamping screw configured such that a longitudinal direction thereof is disposed so as to be parallel to a horizontal line that joins an axial center of the first screw receiving hole and an axial center of the second screw receiving hole.

7. The vent assembly device for a twin-screw extruder according to claim 1, wherein from among the vent assembly units, the vent assembly unit positioned on the left outermost side and the vent assembly unit positioned on the right outermost side, as viewed from a cross-section of the vent assembly, have an L-shape as viewed in a cross-section.

8. The vent assembly device for a twin-screw extruder according to claim 2, wherein from among the vent assembly units, the vent assembly unit positioned on the left outermost side and the vent assembly unit positioned on the right outermost side, as viewed from a cross-section of the vent assembly, have an L-shape as viewed in a cross-section.

9. The vent assembly device for a twin-screw extruder according to claim 3, wherein from among the vent assembly units, the vent assembly unit positioned on the left outermost side and the vent assembly unit positioned on the right outermost side, as viewed from a cross-section of the vent assembly, have an L-shape as viewed in a cross-section.

10. The vent assembly device for a twin-screw extruder according to claim 4, wherein from among the vent assembly units, the vent assembly unit positioned on the left outermost side and the vent assembly unit positioned on the right outermost side, as viewed from a cross-section of the vent assembly, have an L-shape as viewed in a cross-section.

11. The vent assembly device for a twin-screw extruder according to claim 1, wherein the vent assembly units all have an L-shaped cross-section, such that a top piece that is formed at the top of each of the vent assembly units extends in a horizontal direction, and a fixing screw is screwed in each top piece along a vertical direction.

12. A twin-screw extruder comprising:
a twin-screw extruder housing defining first and second screw receiving holes;
a left side screw received in the first screw receiving hole;
a right side screw received in the second screw receiving hole;
a vent assembly disposed in a vent receiving hole of the twin-screw extruder housing, the vent assembly forming a single vent opening,
the vent assembly comprising a plurality of vent assembly units, wherein the size of the vent opening of the vent assembly can be modified by removing one or more of the plurality of vent assembly units.

* * * * *